Oct. 6, 1953  H. A. CARLSON  2,654,389
METERING VALVE ADJUSTMENT
Filed Feb. 12, 1947

INVENTOR
HAROLD A. CARLSON
BY
George R. Ericson
ATTORNEY

Patented Oct. 6, 1953

2,654,389

UNITED STATES PATENT OFFICE 2,654,389

METERING VALVE ADJUSTMENT

Harold A. Carlson, University City, Mo., assignor to Carter Carburetor Corporation, St. Louis, Mo., a corporation of Delaware Application February 12, 1947, Serial No. 727,964

1 Claim. (Cl. 137—605)

This invention relates to multiple valve controls for the proportional delivery of at least two fluids.

Heretofore the resetting or readjustment of such valves has necessitated the individual adjustment of each valve or at least one of them together with their interconnecting means by the use of suitable gauges or templates.

The main object of the present invention is to provide simple, readily available means for insuring proper relative adjustment of the valves without the use of such special gauges or the like.

Figure 1:
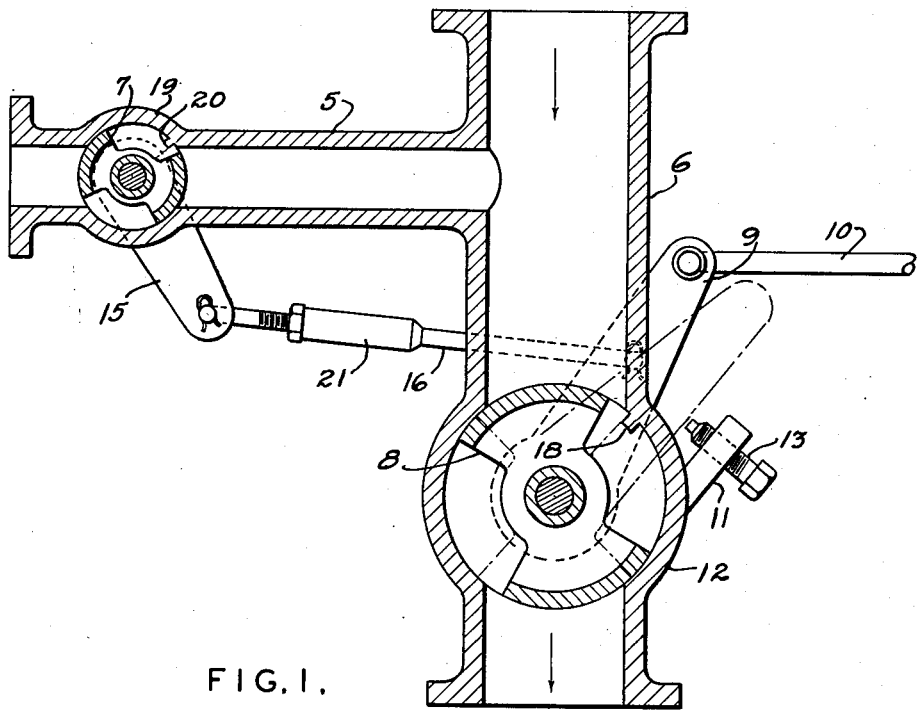

In the accompanying drawing which illustrates the invention, Fig. 1 is a sectional view illustrating one form of the multiple valve control and adjusting means.

Figure 2:
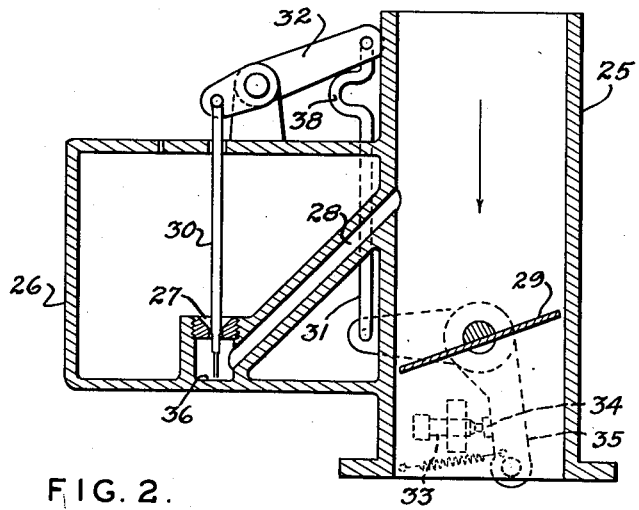

Fig. 2 illustrates another embodiment of the invention.

Fig. 1 shows a pair of intersecting pipes 5 and 6 controlled, respectively, by plug valves 7 and 8. The system may be used, for instance, in the chemical industry for the mixture of two fluids such as hydrochloric acid gas and water to provide a solution of the gas of the proper strength. Valve 8 controls the delivery of the solution and is provided with an actuator lever 9 having a link 10 or other manual control. An arm 11 projecting from valve casing 12 carries an adjusting screw 13 which normally limits the closing movement of valve 8 to a predetermined minimum degree of opening necessary for normal operation of the system and which degree of opening is subject to adjustment by the attendant.

Valve 7 is provided with a control arm 15 which is connected by a link 16 to lever 9 on valve 8. The arrangement is such that valves 7 and 8 open and close together either at the same rate or a varied rate dependent upon the relative lengths and angular displacements of lever arms 9 and 15. Stop screw 13 normally limits the closing movement of valve 7 as well as valve 8.

After long use, the relative positioning of the valves may change because, for instance, of wear in link 16 and levers 9 and 15. In order to provide a simple and convenient way of bringing the valves back to their proper adjustment, I provide on valve case 12 a fixed stop 18 and on valve case 19 for valve 7 a fixed stop 20, these stops being conveniently formed in or on the walls of the valve casings. The stops are accurately positioned and machined so that when both valves engage the same (as in broken lines), they are in their proper relative positions. In the present instance, the valves engage the stops after both are fully closed and, consequently, it is necessary to retract adjusting screw 13, as shown, for this purpose. Connecting link 16 between the valves is provided with a threaded adjusting sleeve 21 which may be rotated to vary the length of the connection to facilitate this adjustment. Consequently, when both valves are brought against fixed stops 18 and 20, the operator may be certain that they are properly adjusted.

The form in Fig. 2 shows an application of the principle to a carburetor for internal combustion engines. Adjacent the air pipe 25 there is provided a bowl or constant level chamber 26 from which liquid fuel is fed through a metering orifice element 27 and fuel nozzle 28 opening into the air passage. A throttling valve 29 of the butterfly type controls the discharge of fuel and air mixture to the engine and a metering pin or rod 30 adjusts the size of the liquid fuel metering orifice. Throttle 29 is connected to the metering pin by means of a link 31 and pivoted lever 32 so that upon opening of the throttle, the metering pin is lifted moving the smaller, lower portion of the pin into the metering orifice.

The normal closed or idling position of the throttle, as shown, is controlled by an adjusting screw 33 which engages a lip 34 on throttle actuator arm 35 so as normally to maintain the throttle slightly open.

The metering pin normally operates freely within orifice element 27 and clears bottom wall 36 of the fuel bowl immediately therebeneath. However, this bottom wall is accurately machined so that if adjusting screw 33 is retracted to permit the throttle plate to engage the inner wall of the air passage, the bottom of the metering pin should just engage wall 36 if it is properly adjusted. Link 31 is provided with an adjusting convolution 38 which may be compressed or separated to insure the proper relative positioning of valves 29 and 30, as determined in this manner.

Accordingly, in both forms, fixed stops are provided beyond the normal range of operation of the valves and which serve as index points to insure proper relative positioning of the valves.

Various other applications will occur to those skilled in the art and the exclusive use of all modifications as come within the scope of the appended claim is contemplated.

I claim:

A system for proportional mixing of two fluids comprising a fluid mixing conduit and a butterfly valve controlling the same, said butterfly valve being movable to a position fully closing said mixture conduit, manually adjustable means for limiting the movement of said butterfly valve in the direction of its closing movement, an actuator for said butterfly valve, a fluid reservoir adjacent said conduit, a supply passage connecting said reservoir and said conduit, a metering orifice in the reservoir end of the supply passage permitting the flow of fuel from the reservoir to said passage, an ormally unseating metering pin with a tapered metering portion at one end reciprocably received in said orifice, said metering pin adjacent said tapered metering portion being of a diameter less than the diameter of said orifice to permit its movement freely therethrough beyond said tapered metering portion, said supply passage including a wall portion facing said orifice and in the path of movement of said metering pin and constituting a datum point, said wall portion being so spaced with respect to said orifice as to provide a predetermined limit of movement for said metering pin when the latter passes through said orifice beyond its tapered metering portion, an operable adjustable connection between said butterfly valve and said metering pin permitting movement of said metering pin into engagement with said wall portion and full closing of said throttle, and adjustable means restractable into and out of engagement with said throttle to selectively provide a stop to limit closing movement of the throttle and metering rod to an operable position or to a fully closed inoperative position to permit adjustment from a datum point.

HAROLD A. CARLSON.

References Cited in the file of this patent

UNITED STATES PATENTS

| Number | Name | Date |
|---|---|---|
| 913,121 | Frayer | Feb. 23, 1909 |
| 1,014,328 | Podlesak | Jan. 9, 1912 |
| 1,176,816 | De Fontaine | Mar. 28, 1916 |
| 1,215,381 | Kemp | Feb. 13, 1917 |
| 1,292,464 | Henrikson | Jan. 28, 1919 |
| 1,294,182 | Severson | Feb. 11, 1919 |
| 1,404,905 | Stockum | Jan. 31, 1922 |
| 1,934,953 | Suiter | Nov. 14, 1933 |
| 1,952,614 | Smiley | Mar. 27, 1934 |
| 2,073,891 | Vogler | Mar. 16, 1937 |